(12) United States Patent
Lee et al.

(10) Patent No.: US 11,010,871 B1
(45) Date of Patent: May 18, 2021

(54) DEVICE AND METHOD OF HANDLING IMAGE SUPER-RESOLUTION

(71) Applicant: Moxa Inc., New Taipei (TW)

(72) Inventors: Wei-Yu Lee, New Taipei (TW); Po-Yu Chuang, New Taipei (TW); Yu-Chiang Wang, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 16/796,872

(22) Filed: Feb. 20, 2020

Related U.S. Application Data

(60) Provisional application No. 62/930,581, filed on Nov. 5, 2019.

(51) Int. Cl.
*G06T 3/40* (2006.01)

(52) U.S. Cl.
CPC .......... *G06T 3/4053* (2013.01); *G06T 3/4046* (2013.01)

(58) Field of Classification Search
CPC ................. G06T 3/4053; G06T 3/4046; G06T 3/4061–4076
See application file for complete search history.

(56) References Cited

U.S. PATENT DOCUMENTS

2017/0256033 A1* 9/2017 Tuzel ................. G06K 9/00255

OTHER PUBLICATIONS

Chen, Rong, et al. "Joint-attention discriminator for accurate super-resolution via adversarial training." Proceedings of the 27th ACM International Conference on Multimedia. 2019. (Year: 2019).*
Zhang, Yulun, et al. "Image Super-Resolution Using Very Deep Residual Channel Attention Networks." European Conference on Computer Vision. Springer, Cham, 2018. (Year: 2018).*
Seitzer, Maximilian, et al. "Adversarial and perceptual refinement for compressed sensing MRI reconstruction." International conference on medical image computing and computer-assisted intervention. Springer, Cham, 2018. (Year: 2018).*
Arjovsky, Martin, Soumith Chintala, and Léon Bottou. "Wasserstein generative adversarial networks." Proceedings of the 34th International Conference on Machine Learning—vol. 70. 2017. (Year: 2017).*

(Continued)

*Primary Examiner* — Geoffrey E Summers
(74) *Attorney, Agent, or Firm* — Winston Hsu

(57) ABSTRACT

A computing device for handling image super-resolution (ISR), comprises a generator module, for receiving at least one input image, to generate an output image according to at least one first parameter and a first plurality of feature maps generated by at least one first channel attention (CA); a discriminator module, for receiving the output image and a high resolution (HR) image, to generate a second plurality of feature maps and a third plurality of feature maps by at least one second CA, and to generate at least one score according to the second plurality of feature maps, the third plurality of feature maps and at least one second parameter; and a feedback module, for receiving the at least one score, to update the at least one first parameter and the at least one second parameter according to the at least one score and an objective function.

8 Claims, 6 Drawing Sheets

(56) References Cited

OTHER PUBLICATIONS

Brownlee, Jason. "How to Code the GAN Training Algorithm and Loss Functions." Machine Learning Mastery, Jul. 17, 2019, https://machinelearningmastery.com/how-to-code-the-generative-adversarial-network-training-algorithm-and-loss-functions/. (Year: 2019).*
Cao, Feilong, and Huan Liu. "Single image super-resolution via multi-scale residual channel attention network." Neurocomputing 358 (2019): 424-436. (Year: 2019).*
He, Kaiming, et al. "Identity mappings in deep residual networks." European conference on computer vision. Springer, Cham, 2016. (Year: 2016).*
Hu, Jie, et al. "Squeeze-and-Excitation Networks." IEEE Transactions on Pattern Analysis and Machine Intelligence 42.8 (2019): 2011-2023. (Year: 2019).*

\* cited by examiner

| Dataset | Methods (PI/RMSE) | | |
|---|---|---|---|
| | EnhanceNet | ESRGAN | The present invention |
| Set5 | 3.865/9.879 | 3.871/7.919 | 3.759/7.750 |
| Set14 | 3.053/15.495 | 2.916/15.139 | 2.987/13.126 |
| BSD100 | 2.922/16.887 | 2.489/16.498 | 2.461/14.824 |
| Urban100 | 3.654/19.751 | 3.770/18.939 | 3.458/16.295 |

FIG. 5

DEVICE AND METHOD OF HANDLING IMAGE SUPER-RESOLUTION

CROSS REFERENCE TO RELATED APPLICATIONS

This application claims the benefit of U.S. Provisional Application No. 62/930,581 filed on Nov. 5, 2019, which is incorporated herein by reference.

BACKGROUND OF THE INVENTION

1. Field of the Invention

The present invention relates to a device and a method used in a multimedia system, and more particularly, to a device and a method of handling image super-resolution.

2. Description of the Prior Art

Image super-resolution (ISR) aims to reconstruct a high-resolution (HR) image from a low resolution (LR) image. Various methods have been proposed for minimizing differences between the HR image and an output image, when handling the ISR. However, some of the methods have a high peak signal-to-noise ratio (PSNR) performance while having a low perceptual quality (e.g., the output image is overly smooth). The others of the methods have a high perceptual quality while having a low PSNR performance (e.g., the output image has structure distortion). Thus, a method for handing the ISR with a better tradeoff between the PSNR performance and the perceptual quality is needed.

SUMMARY OF THE INVENTION

The present invention therefore provides a device and a method for handling image super-resolution to solve the abovementioned problem.

A computing device for handling image super-resolution (ISR), comprises a generator module, for receiving at least one input image, to perform the following operations: generating a first plurality of feature maps of the at least one input image by at least one first channel attention (CA); and generating an output image according to the first plurality of feature maps and at least one first parameter of the generator module; a discriminator module, coupled to the generator module, for receiving the output image and a high resolution (HR) image, to perform the following operations: generating a second plurality of feature maps of the output image and a third plurality of feature maps of the HR image by at least one second CA; and generating at least one score according to the second plurality of feature maps, the third plurality of feature maps and at least one second parameter of the discriminator module; and a feedback module, couple to the generator module and the discriminator module, for receiving the at least one score, to update the at least one first parameter and the at least one second parameter according to the at least one score and an objective function.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a comparison table of experiment results according to an example of the present invention.

DETAILED DESCRIPTION

Figure 1:
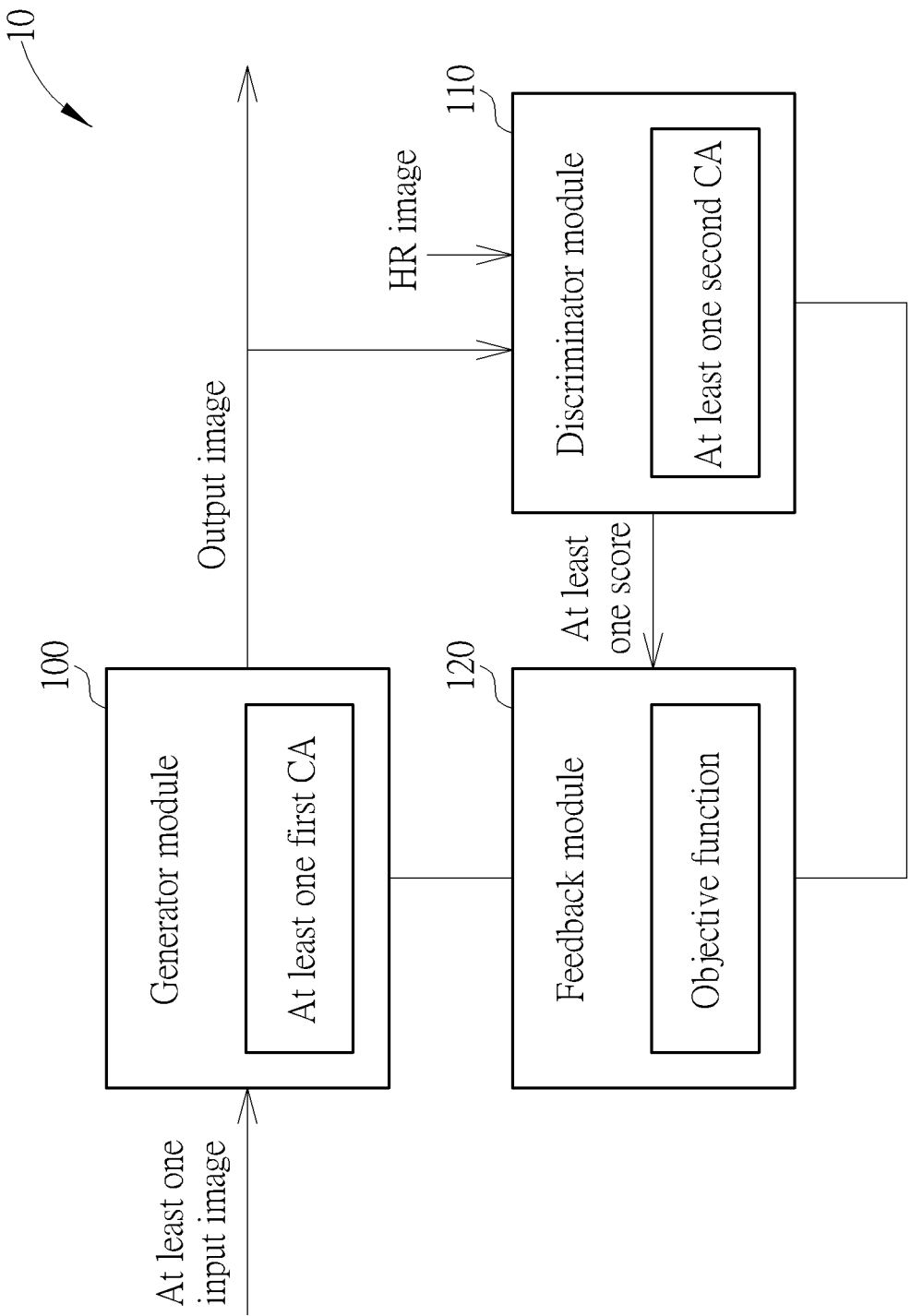
FIG. 1 is a schematic diagram of a computing device according to an example of the present invention.

FIG. 1 is a schematic diagram of a computing device 10 according to an example of the present invention. The computing device 10 includes a generator module 100, a discriminator module 110 and a feedback module 120. In detail, the generator module 100 receives at least one input image, and generates a first plurality of feature maps of the at least one input image by at least one first channel attention (CA). The generator module 100 generates an output image according to at least one first parameter of the generator module 100 and the first plurality of feature maps. The discriminator module 110 is coupled to the generator module 100, and receives the output image and a high resolution (HR) image. The discriminator module 110 generates a second plurality of feature maps of the output image and a third plurality of feature maps of the HR image by at least one second CA, and generates at least one score (e.g., at least one probability or at least one distance) according to at least one second parameter of the discriminator module 110, the second plurality of feature maps and the third plurality of feature maps. The feedback module 120 is coupled to the generator module 100 and the discriminator module 110, and receives the at least one score. The feedback module 120 updates the at least one first parameter and the at least one second parameter according to the at least one score and an objective function.

In one example, the feedback module 120 generates a first value to update the at least one first parameter of the generator module 100 according to the first value. The feedback module 120 generates a second value to update the at least one second parameter of the discriminator module 110 according to the second value.

In one example, the feedback module 120 may generate the first value when updating the at least one first parameter of the generator module 100 is requested (e.g., configurated), and the at least one second parameter of the discriminator module 110 may be fixed. In one example, the feedback module 120 may generate the second value when updating the at least one second parameter of the discriminator module 110 is requested (e.g., configurated), and the at least one first parameter of the generator module 100 may be fixed. That is, the feedback module 120 may only update parameter(s) of a module (i.e., the generator module 100 or the discriminator module 110) in an iteration, and parameter(s) of the other module (i.e., the discriminator module 110 or the generator module 100) is fixed.

In one example, the feedback module 120 uses an Adaptive Moment Estimation (ADAM) optimizer to update the at least one first parameter according to the first value in an iteration. After the iteration for updating the at least one first parameter, the generator module 100 may generate a new output image according to at least one new first parameter of the generator module 100 that is updated, wherein the new output image has a higher quality than that of a present output image (i.e., the new output image with higher PSNR performance). Thus, the discriminator module 110 generates at least one new score after receiving the new output image and the HR image, wherein new difference between the at least one new score may be smaller than present difference between at least one present score.

In one example, the feedback module 120 uses an ADAM optimizer to update the at least one second parameter according to the second value in an iteration. After the iteration for updating the at least one second parameter, the discriminator module 110 generates at least one new score according to at least one new second parameter of the discriminator module 110 that is updated when receiving the same output image and HR image. New difference between the at least one new score may be larger than present difference between at least one present score.

In one example, the at least one first parameter of the generator module 100 is updated after the at least one second parameter of the discriminator module 110 is updated N times, wherein the N is a positive integer. In one example, the at least one second parameter of the discriminator module 110 is updated after the at least one first parameter of the generator module 100 is updated M times, wherein the M is a positive integer.

In one example, the discriminator module 110 generates a first score according to the second plurality of feature maps of the output image and the at least one second parameter, after receiving the output image. The discriminator module 110 generates a second score according to the third plurality of feature maps of the HR image and the at least one second parameter, after receiving the HR image. Then, the feedback module 120 receives the first score and the second score, to update the at least one first parameter and the at least one second parameter according to an objective function and these scores.

In one example, the discriminator module 110 generates a score for distinguishing (e.g., discriminating) how real (or fake) an image is (i.e., for distinguishing whether the image is more likely to be a HR image or an output image generated by the generator module 100), after receiving the image. Larger difference between at least one score (e.g., the first score and the second score) represents that the discriminator module 110 distinguishes a HR image and an output image more successfully.

In one example, a target of the discriminator module 110 is to increase difference between at least one score when receiving the same output image and HR image.

In one example, a target of the generator module 100 is to generate an output image with a quality same as that of the HR image (i.e., to reduce difference between at least one score after generating a new output image with higher PSNR performance than before).

In one example, the generator module 100 independently operates without the discriminator module 110 and the feedback module 120, e.g., when the generator module 100 is not able to generate an output image with a higher PSNR performance than before, and/or when an output image and the HR image cannot be distinguished according to at least one score generated by the discriminator module 110 (e.g., difference of the at least one score is close to zero). In one example, the generator module 100 independently operates without the discriminator module 110 and the feedback module 120, e.g., when a termination condition (e.g., a number of iterations is equal to a default value) is satisfied. In this situation, the generator module 100 can start to generate an output image with a high quality close to that of a HR image.

In one example, the at least one first CA is the same or different. In one example, the at least one second CA is the same or different. In one example, the at least one first CA is the same as or different from the at least one second CA.

In one example, the at least one first CA comprises at least one of a global pooling layer, a convolution layer and an activation function layer. In one example, the at least one second CA comprises at least one of a global pooling layer, a convolution layer and an activation function layer. The activation function layer for the both examples may be a leaky Rectified Linear Unit (ReLU) function layer or a sigmoid function layer.

In one example, the generator module 100 generates the first plurality of feature maps by the at least one first CA to focus on (e.g., extract) at least one first feature of the at least one input image in a single scale. In one example, the discriminator module 110 generates the second plurality of feature maps and the third plurality of feature maps by the at least one second CA to preserve at least one second feature of the output image and at least one third feature of the HR image in at least one scale (e.g., different scale).

In the prior art, methods for image super-resolution (ISR) may be divided to two categories according to ways for optimizing output images. The two ways may be pixel-wise differences minimization and perceptual quality optimization. Peak signal-to-noise ratio (PSNR)-based methods based on the pixel-wise differences minimization for optimizing the output images are designed to minimize pixel-wise differences between HR images and the output images. Although the PSNR-based methods achieve outstanding performance on PSNR and Structure Similarity (SSIM), the output images generated by the PSNR-based methods may not satisfy evaluation of Human Visual System (HVS). On the other hand, generative adversarial networks (GAN)-based methods based on the perceptual quality optimization for optimizing the output images are designed to reconstruct texture details of input images. Although the GAN-based methods produce a better perceptual quality, the output images generated by the GAN-based methods may have structure distortion and artifacts.

The present invention provides a refiner for the ISR methods. The refiner aims to overcome an overly smoothed problem of the PSNR-based methods and a structure distortion problem of the GAN-based methods. Thus, the problems of the PSNR-based methods and the GAN-based methods are solved.

In one example, the at least one input image is generated according to a processing method for the ISR. Further, the processing method may be a residual channel attention networks (ROAN), a deep back-projection networks (DBPN) or an enhanced deep super-resolution network (EDSR). In one example, the output image is generated according to a structure of the at least one input image via an identity mapping. In one example, the at least one input image is generated according to a PSNR-based method. Thus, the generator module 100 may only need to focus on missing details (e.g., features) of the at least one input image to generate an output image.

Figure 2:
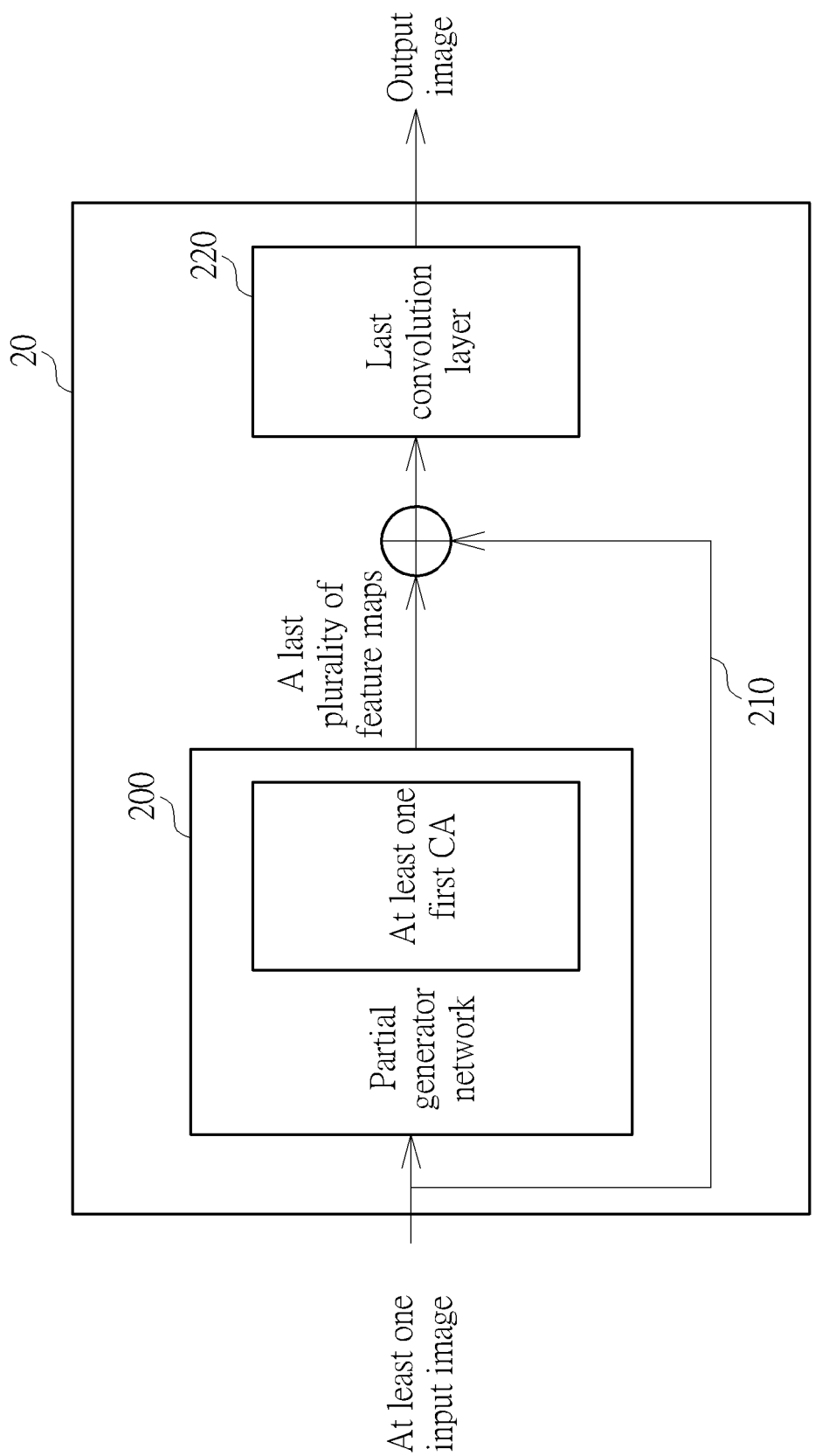
FIG. 2 is a schematic diagram of a generator according to an example of the present invention.

FIG. 2 is a schematic diagram of a generator 20 according to an example of the present invention. The generator 20 may be utilized for realizing the generator module 100 in FIG. 1. The generator 20 includes a partial generator network 200, an identity mapping 210 (e.g., an identity mapping shortcut) and a last convolution layer 220. The identity mapping 210 is established between at least one input image and the last convolution layer 220. The partial network 200 receives the at least one input image, and generates a last plurality of feature maps according to at least one third parameter of the generator 20 and at least one first CA. The generator 20 uses the identity mapping 210 to preserve a structure of the at least one input image. The last convolution layer 220 receives the last plurality of feature maps and the at least one input image, and generates an output image according the at least one third parameter, the last plurality of feature maps and the structure of the at least one input image. In other words, the generator 20 uses the identity mapping 210 to maintain a structure of the output image according to the structure of the at least one input image.

In one example, the partial network 200 includes others convolution layers, wherein the convolution layers may have stride=1. In one example, the last convolution layer 220 may have stride=1.

Figure 3:
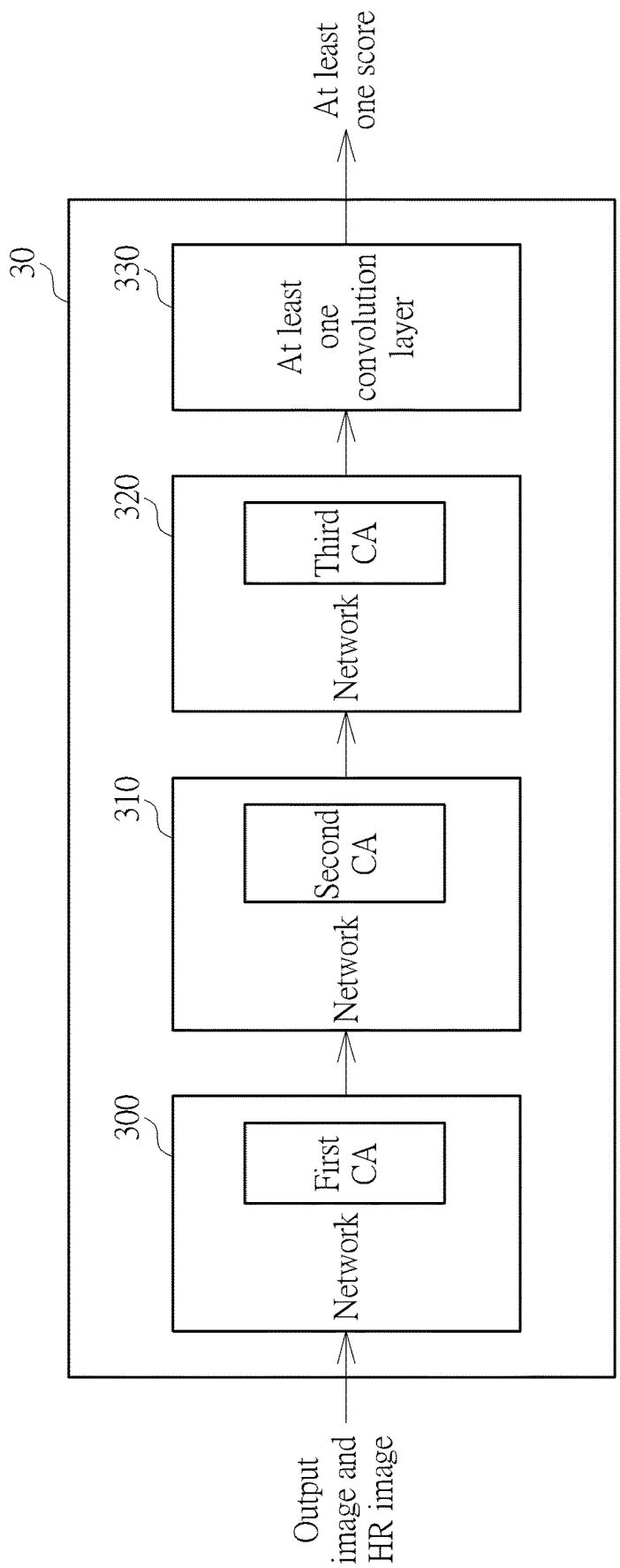
FIG. 3 is a schematic diagram of a discriminator according to an example of the present invention.

FIG. 3 is a schematic diagram of a discriminator 30 according to an example of the present invention. The discriminator 30 may be utilized for realizing the discriminator module 110 in FIG. 1. The discriminator 30 includes networks 300, 310, 320 and at least one convolution layer 330. The networks 300, 310 and 320 include a first CA, a second CA and a third CA, respectively, and generate different feature maps of an output image and a HR image with different scales according to the CAs. The at least one convolution layer 330 receives feature maps generated by the network 320, and generates at least one score. That is, the discriminator 30 uses the CAs in three scales, to generate at least one score according to the different feature maps with the different scales.

In one example, according to FIG. 3, the discriminator 30 extracts at least one second feature of the output image and at least one third feature of the HR image by the CAs in at least one scale (e.g., different scales). For example, the network 300 may extract lowest-level features of the output image and the HR image by the first CA in a finest scale. The network 310 may extract median-level features of the output image and the HR image by the second CA in a median scale. The network 320 may extract highest-level features of the output image and the HR image by the third CA in a coarsest scale. In one example, the first CA, the second CA and the third CA may be the same or different.

In one example, the network 300, 310 and 320 include convolution layers, wherein the convolution layers may have stride=2. The at least one convolution layer 330 may have stride=2. Thus, the discriminator 30 can downscale the feature maps to reduce computational complexity.

In one example, operations of the CA are described as follows. The CA receives a plurality of feature maps without weightings (e.g., priorities) $F:\{f_1, f_2, \ldots, f_n\}$, and generates a plurality of weighted feature maps $F':\{f'_1, f'_2, \ldots, f'_n\}=W\cdot F$, wherein $W:\{w_1, w_2, \ldots, w_n\}$ are the weightings, and n is a number of the plurality of feature maps. That is, the CA is used in the generator module 100 to weight the plurality of feature maps without the weightings, to compensate details of the at least one input image for generating the output image according to the plurality of weighted feature maps (i.e., the first plurality of feature maps). The CA is used in the discriminator module 110 to weight the plurality of feature maps without the weightings, to extract (e.g., focus on) at least one second feature of the output image and at least one third feature of the HR image for generating the at least one score according to the plurality of weighted feature maps (i.e., the second plurality of feature maps).

Figure 4:
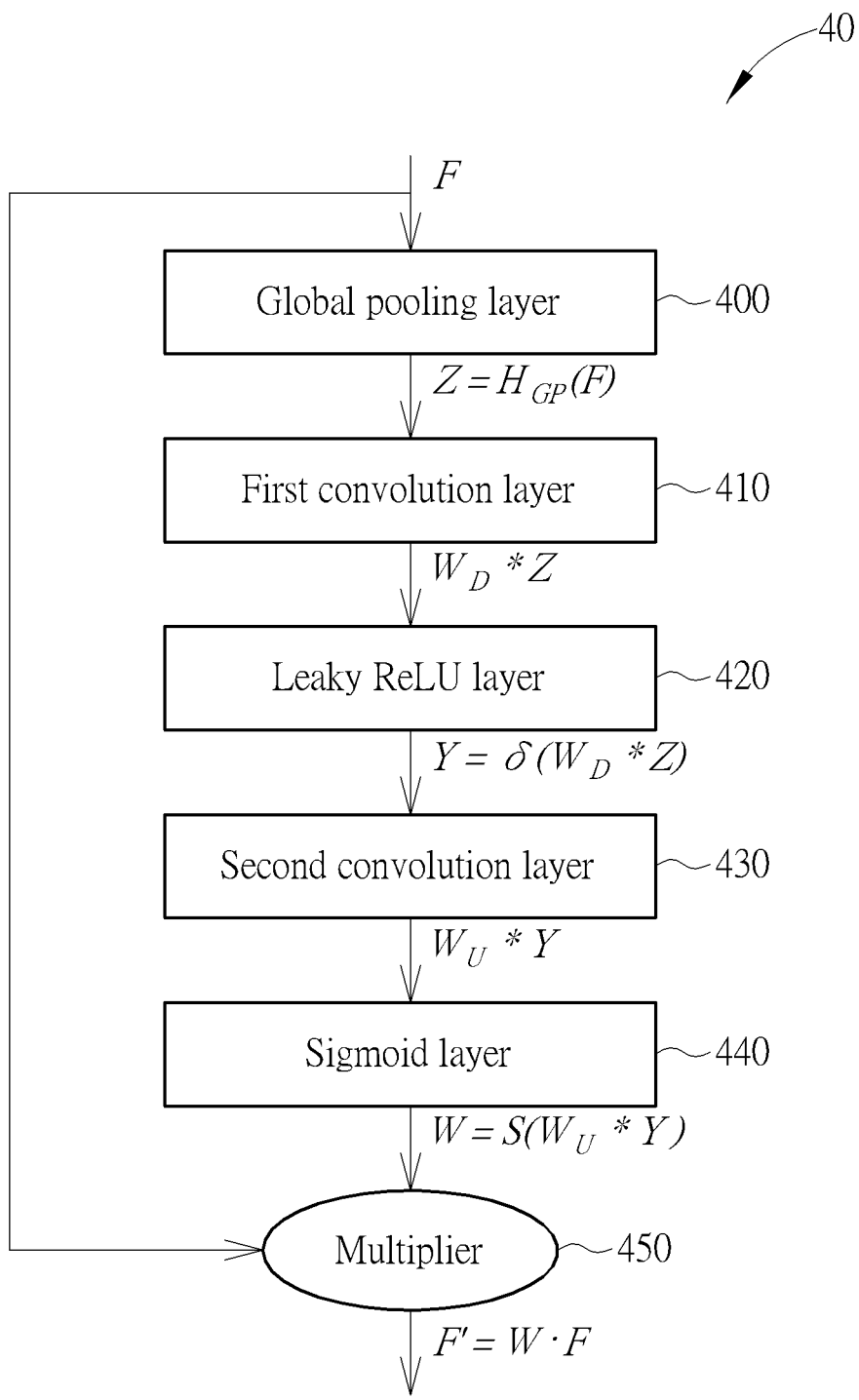
FIG. 4 is a schematic diagram of a CA according to an example of the present invention.

FIG. 4 is a schematic diagram of a CA 40 according to an example of the present invention. The CA 40 may be utilized in the at least one first CA and the at least one second CA of FIG. 1. The CA 40 includes a global pooling layer 400, a first convolution layer 410, a leaky ReLU function layer 420, a second convolution layer 430 and a sigmoid function layer 440 and a multiplier 450. The global pooling layer 400 processes a plurality of feature maps without weightings $F:\{f_1, f_2, \ldots, f_n\}$ and compresses the plurality of feature maps to generate initial weightings $Z=H_{GP}(F)$, wherein $H_{GP}(\ )$ is a global pooling function and a number of the initial weightings is n (i.e., $Z:\{z_1, z_2, \ldots, z_n\}$). The first convolution layer 410 processes the initial weightings $Z=H_{GP}(F)$, and generates channel-downscaled weightings $W_D*Z$, wherein a number of the channel-downscaled weightings is smaller than the n. The leaky ReLU function layer 420 processes the channel-downscaled weightings $W_D*Z$, and generates leaky ReLU weightings $Y=\delta(W_D*Z)$, wherein $\delta(\ )$ is a leaky ReLU function. The second convolution layer 430 processes the leaky ReLU weightings $Y=\delta(W_D*Z)$, and generates channel-upscaled weightings $W_U*Y$, wherein a number of the channel-upscaled weightings is equal to the n. The sigmoid function layer 440 processes the channel-upscaled weightings $W_U*Y$, and generates final weightings $W=S(W_U*Y)$, wherein $S(\ )$ is a sigmoid function. The multiplier 450 multiplies the plurality of feature maps without the weightings $F:\{f_1, f_2, \ldots, f_n\}$ and the final weightings $W=S(W_U*Y)$, and generates a plurality of weighted features maps $F'=W\cdot F$.

In one example, the objective function comprises at least one regularizer (e.g., at least one regularization function) and a Wasserstein Generative Adversarial Network (WGAN) loss function. The at least one regularizer may be a mean square error (MSE) function $L_2$ or a perceptual loss function $L_p$. The perceptual loss function $L_p$ may be another MSE function of a certain layer output of the discriminator module 110 (after activation function layer), which not only allows the discriminator module 110 to focus on the at least one second feature of the output image and the at least one third feature of the HR image, but also helps the generator module 100 to generate the output image that satisfy a perceptual quality. The MSE function $L_2$ and the perceptual loss function $L_p$ may be performed according to the following equations:

$$L_2 = E_{I^{HR},I^{SR}}[(I^{HR}-G(I^{SR}))^2], \quad \text{(Eq. 1)}$$

$$L_p = E_{I^{HR},I^{SR}}[(\theta_i(I^{HR})-\theta_i(I^{SR})))^2], \quad \text{(Eq. 2)}$$

wherein $E_{I^{HR},I^{SR}}(\ )$ is an expected value formula, and $I^{HR}$ is the HR image, and $G(I^{SR})$ is the output image generated by the generator module 100, and $\theta_i$ indicates the ith layer of feature maps of the discriminator module 110 after the activation function layer.

The objective function $L_{total}$ is optimized for solving an adversarial min-max problem, to update the at least one first parameter of the generator module 100 or the at least one second parameter of the discriminator module 110 according to the objective function. The objective function may be performed according to the following equation:

$$L_{total} = L + \lambda_1 L_2 + \lambda_2 L_p, \quad \text{(Eq. 3)}$$

wherein L is the WGAN loss function, and the coefficients $\lambda_1$ and $\lambda_2$ in the equation (Eq. 3) are two fixed values.

FIG. 5 is a comparison table 50 of experiment results according to an example of the present invention. In FIG. 5, three methods generate the experiment results with different datasets: EnhanceNet, ESRGAN and an example of the present invention, and the experiment results of the methods are then compared. Benchmarks of the experiment results are Perceptual Index (PI) and Root Mean Square Error (RMSE), and the qualitative and quantitative experiment results are shown. In the example of the present invention, at least one input image is generated according to ROAN. According to the comparison table 50, the experiment results show that the example of the present invention has better performance than the other methods.

Figure 6:
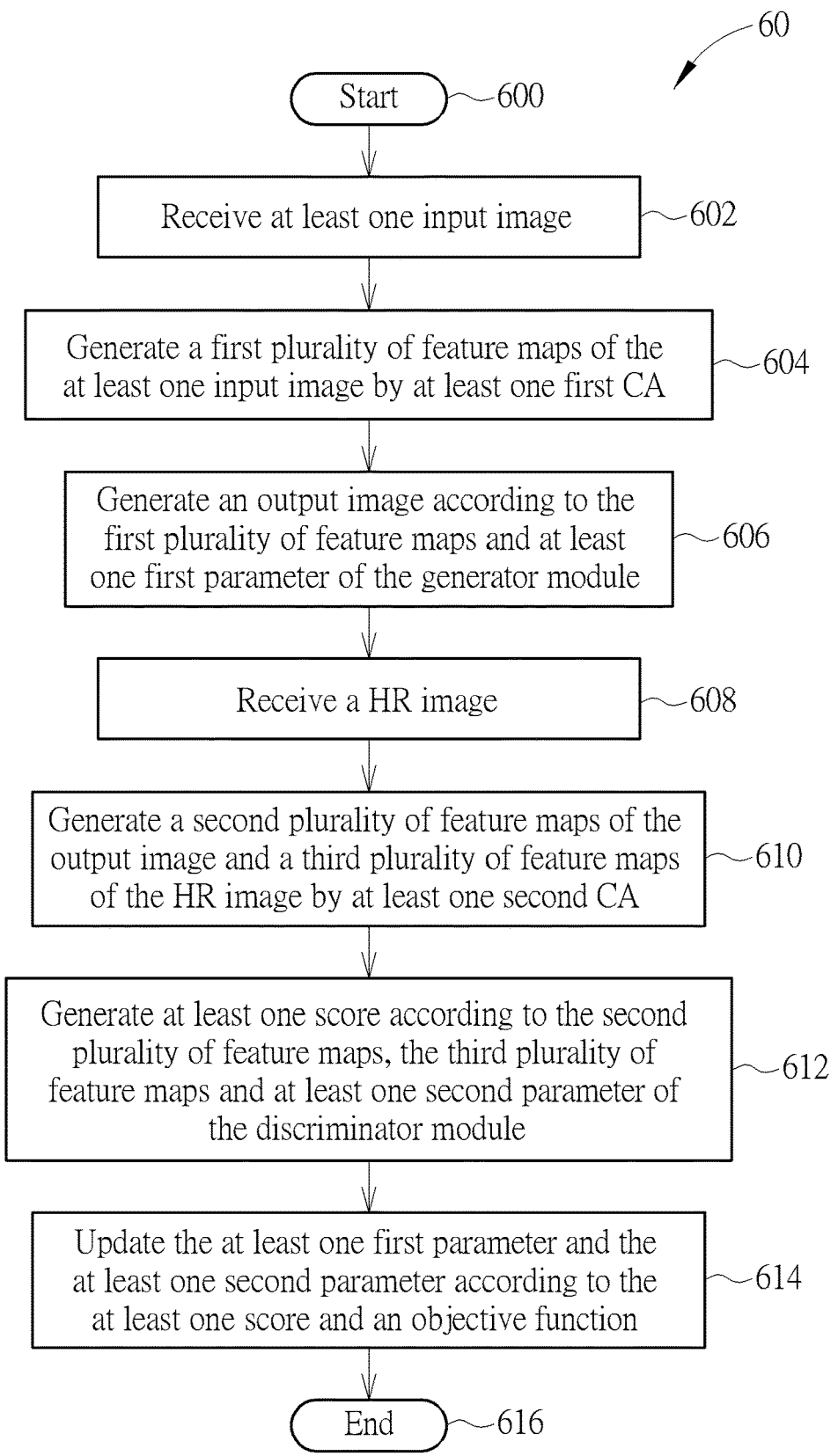
FIG. 6 is a flowchart of a process according to an example of the present invention.

Operations of the computing device 10 in the above examples can be summarized into a process 60 shown in FIG. 6. The process 60 is utilized in the computing device 10, and includes the following steps:

Step 600: Start.

Step 602: Receive at least one input image.

Step 604: Generate a first plurality of feature maps of the at least one input image by at least one first CA.

Step 606: Generate an output image according to the first plurality of feature maps and at least one first parameter of the generator module.

Step 608: Receive a HR image.

Step 610: Generate a second plurality of feature maps of the output image and a third plurality of feature maps of the HR image by at least one second CA.

Step 612: Generate at least one score according to the second plurality of feature maps, the third plurality of feature maps and at least one second parameter of the discriminator module.

Step 614: Update the at least one first parameter and the at least one second parameter according to the at least one score and an objective function Step 616: End.

The process 60 is used for illustrating the operations of the computing device 10. Detailed description and variations of the process 60 can be referred to the previous description, and are not narrated herein.

Those skilled in the art should readily make combinations, modifications and/or alterations on the abovementioned description and examples. The abovementioned generator, discriminator, description, functions, modules and/or processes including suggested steps can be realized by means that could be hardware, software, firmware (known as a combination of a hardware device and computer instructions and data that reside as read-only software on the hardware device), an electronic system, or combination thereof.

Examples of the hardware may include analog circuit(s), digital circuit (s) and/or mixed circuit (s). For example, the hardware may include application-specific integrated circuit(s) (ASIC(s)), field programmable gate array(s) (FPGA(s)), programmable logic device(s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include Subscriber Identity Module (SIM), Read-Only Memory (ROM), flash memory, Random Access Memory (RAM), CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a computing device for handling ISR. Comparing with the prior art, the present invention not only improves perceptual quality of output image but also overcomes structure distortion problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing device for handling image super-resolution (ISR), comprising:
    a generator module, for receiving at least one input image, to perform the following operations:
        generating a first plurality of feature maps of the at least one input image by at least one first channel attention (CA); and
        generating an output image according to the first plurality of feature maps and at least one first parameter of the generator module;
    a discriminator module, coupled to the generator module, for receiving the output image and a high resolution (HR) image, to perform the following operations:
        generating a second plurality of feature maps of the output image and a third plurality of feature maps of the HR image by at least one second CA; and
        generating at least one score according to the second plurality of feature maps, the third plurality of feature maps and at least one second parameter of the discriminator module; and
    a feedback module, coupled to the generator module and the discriminator module, for receiving the at least one score, to update the at least one first parameter and the at least one second parameter according to the at least one score and an objective function;
    wherein the at least one input image is generated by an ISR processing method.

2. The computing device of claim 1, wherein the ISR processing method is a residual channel attention network (RCAN), a deep back-projection network (DBPN) or an enhanced deep super-resolution network (EDSR).

3. The computing device of claim 1, wherein the generator module generates the output image according to a structure of the at least one input image via an identity mapping.

4. The computing device of claim 1, wherein the discriminator module generates the second plurality of feature maps and the third plurality of feature maps by the at least one second CA in at least one scale.

5. The computing device of claim 1, wherein the at least one first CA comprises at least one of a global pooling layer, a convolution layer and an activation function layer.

6. The computing device of claim 5, wherein the activation function layer is a leaky Rectified Linear Unit (ReLU) function layer or a sigmoid function layer.

7. The computing device of claim 1, wherein the objective function comprises at least one regularizer and a Wasserstein Generative Adversarial Network (WGAN) loss function.

8. The computing device of claim 7, wherein the at least one regularizer is a mean square error (MSE) function or a perceptual loss function.

* * * * *